(12) United States Patent
Oishi et al.

(10) Patent No.: US 10,281,014 B2
(45) Date of Patent: May 7, 2019

(54) AUTO TENSIONER

(71) Applicant: Mitsuboshi Belting Ltd., Kobe-shi, Hyogo (JP)

(72) Inventors: Satoshi Oishi, Hyogo (JP); Koji Nishiyama, Hyogo (JP); Tetsuo Yoneda, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 204 days.

(21) Appl. No.: 15/119,872

(22) PCT Filed: Feb. 12, 2015

(86) PCT No.: PCT/JP2015/053871
§ 371 (c)(1),
(2) Date: Aug. 18, 2016

(87) PCT Pub. No.: WO2015/125691
PCT Pub. Date: Aug. 27, 2015

(65) Prior Publication Data
US 2017/0059015 A1    Mar. 2, 2017

(30) Foreign Application Priority Data

Feb. 18, 2014  (JP) ................................. 2014-028133
Dec. 25, 2014  (JP) ................................. 2014-262127
Jan. 22, 2015  (JP) ................................. 2015-010210

(51) Int. Cl.
*F16H 7/08* (2006.01)
*F16H 7/12* (2006.01)

(52) U.S. Cl.
CPC ......... *F16H 7/1218* (2013.01); *F16H 7/0829* (2013.01); *F16H 7/12* (2013.01);
(Continued)

(58) Field of Classification Search
CPC ............ F16H 7/1218; F16H 2007/081; F16H 2007/084; F16H 2007/0893; F16H 7/1281
(Continued)

(56) References Cited

U.S. PATENT DOCUMENTS 5,470,280 A * 11/1995 Ayukawa .............. F16H 7/1218
474/135
5,503,599 A *  4/1996 Brehler ................. F16H 7/1218
474/112
(Continued)

FOREIGN PATENT DOCUMENTS

CN    1103144 A    5/1995
CN    1144892 A    3/1997
(Continued)

OTHER PUBLICATIONS

May 19, 2017—(TW) Office Action—App 104105702.
(Continued)

*Primary Examiner* — Henry Y Liu
(74) *Attorney, Agent, or Firm* — Banner & Witcoff, Ltd.

(57) ABSTRACT

The present invention relates to an auto-tensioner containing a base having a cylindrical part, a rotating member supported rotatably to the base, a pulley provided at the rotating member, a friction member sandwiched between the cylindrical part and the rotating member, and a coil spring locked to the friction member and the base and disposed in a state of being compressed in an axial direction, thereby biasing the rotating member in one direction, in which the friction member has an arcuate surface capable of sliding along the cylindrical part, a first locking part located further toward the one direction side than the arcuate surface in a circumferential direction of the cylindrical part and locked to the rotating member, and a second locking part locked to one end of the coil spring.

9 Claims, 12 Drawing Sheets

(52) U.S. Cl.
CPC .. *F16H 2007/081* (2013.01); *F16H 2007/084* (2013.01); *F16H 2007/0893* (2013.01)

(58) Field of Classification Search
USPC .......................................................... 474/135
See application file for complete search history.

(56) References Cited

U.S. PATENT DOCUMENTS

| | | | | | |
|---|---|---|---|---|---|
| 5,803,849 | A | * | 9/1998 | Ayukawa | F16H 7/1218 474/135 |
| 6,497,632 | B2 | * | 12/2002 | Ayukawa | F16H 7/1218 474/135 |
| 6,565,468 | B2 | * | 5/2003 | Serkh | F16H 7/1218 474/135 |
| 6,582,332 | B2 | * | 6/2003 | Serkh | F16H 7/1218 474/109 |
| 6,609,988 | B1 | * | 8/2003 | Liu | F16H 7/1218 474/133 |
| 7,819,765 | B2 | * | 10/2010 | Kawahara | F16H 7/1218 474/135 |
| 7,985,151 | B2 | * | 7/2011 | Singer | F16H 7/1218 474/117 |
| 8,092,328 | B2 | * | 1/2012 | Dec | F16H 7/1218 474/135 |
| 8,118,698 | B2 | * | 2/2012 | Guhr | F16H 7/1218 474/135 |
| 8,337,344 | B2 | * | 12/2012 | Meano | F16H 7/1218 474/109 |
| 8,545,352 | B2 | | 10/2013 | Lannutti et al. | |
| 8,562,467 | B2 | * | 10/2013 | Mennerat | F16H 7/1218 474/135 |
| 8,617,013 | B2 | * | 12/2013 | Ferguson | F16H 7/1218 474/135 |
| 8,678,965 | B2 | * | 3/2014 | Ishida | F16H 7/1218 474/113 |
| 8,888,627 | B2 | | 11/2014 | Crist | |
| 9,005,061 | B2 | * | 4/2015 | Liebel | F16H 7/10 474/112 |
| 9,212,731 | B2 | * | 12/2015 | Lindstrom | F16H 7/1218 |
| 9,829,081 | B2 | * | 11/2017 | Jiang | F16H 7/1218 |
| 9,982,760 | B2 | * | 5/2018 | Jiang | F16H 7/1218 |
| 9,982,761 | B2 | * | 5/2018 | Ma | F16H 7/1218 |
| 2003/0216204 | A1 | * | 11/2003 | Serkh | F16H 7/1218 474/135 |
| 2006/0079360 | A1 | * | 4/2006 | Jung | F16H 7/1218 474/135 |
| 2010/0105508 | A1 | * | 4/2010 | Mennerat | F16H 7/1218 474/135 |
| 2010/0184546 | A1 | * | 7/2010 | Singer | F16H 7/1218 474/135 |
| 2011/0201466 | A1 | * | 8/2011 | Ishida | F16H 7/1218 474/113 |
| 2011/0294615 | A1 | * | 12/2011 | Crist | F16H 7/1218 474/135 |
| 2012/0058847 | A1 | * | 3/2012 | Ferguson | F16H 7/1218 474/135 |
| 2012/0058848 | A1 | * | 3/2012 | Lannutti | F16H 7/1218 474/135 |
| 2013/0116073 | A1 | * | 5/2013 | Liebel | F16H 7/1218 474/135 |
| 2016/0290448 | A1 | * | 10/2016 | Jiang | F16H 7/1218 |
| 2017/0059015 | A1 | | 3/2017 | Oishi et al. | |

FOREIGN PATENT DOCUMENTS

| | | |
|---|---|---|
| CN | 103154572 A | 6/2013 |
| DE | 102009052637 A1 | 5/2011 |
| EP | 2333376 A1 | 6/2011 |
| EP | 3109510 A1 | 12/2016 |
| JP | 2006-118668 A | 5/2006 |
| JP | 2009-180245 A | 8/2009 |
| JP | 2010-112549 A | 5/2010 |
| JP | 2011-007273 A | 1/2011 |
| JP | 5231033 B2 | 7/2013 |
| JP | 5276520 B2 | 8/2013 |
| JP | 2013-536929 A | 9/2013 |
| JP | 2014-009722 A | 1/2014 |
| KR | 2013-0131318 A | 12/2013 |
| WO | 2011/149661 A1 | 12/2011 |
| WO | 2015/125691 A1 | 8/2015 |

OTHER PUBLICATIONS

Nov. 6, 2017—(CN) Notification of First Office Action—App 201580009224.1.
Nov. 6, 2017—(KR) Office Action—App 10-2016-7022310.
Aug. 25, 2017—(EP) extended Search Report—App 15752301.0.
Sep. 18, 2017—(CA) Office Action—App 2,935,118.
May 19, 2015—International Search Report—Intl App PCT/JP2015/053871.
Dec. 13, 2016—(JP) Notification of Reasons for Refusal—App 2015-010210.
Apr. 23, 2018—(CA) Office Action—App 2,935,118.
Apr. 19, 2018—(EP) Office Action—App 15752301.0.

* cited by examiner

[FIG. 1]
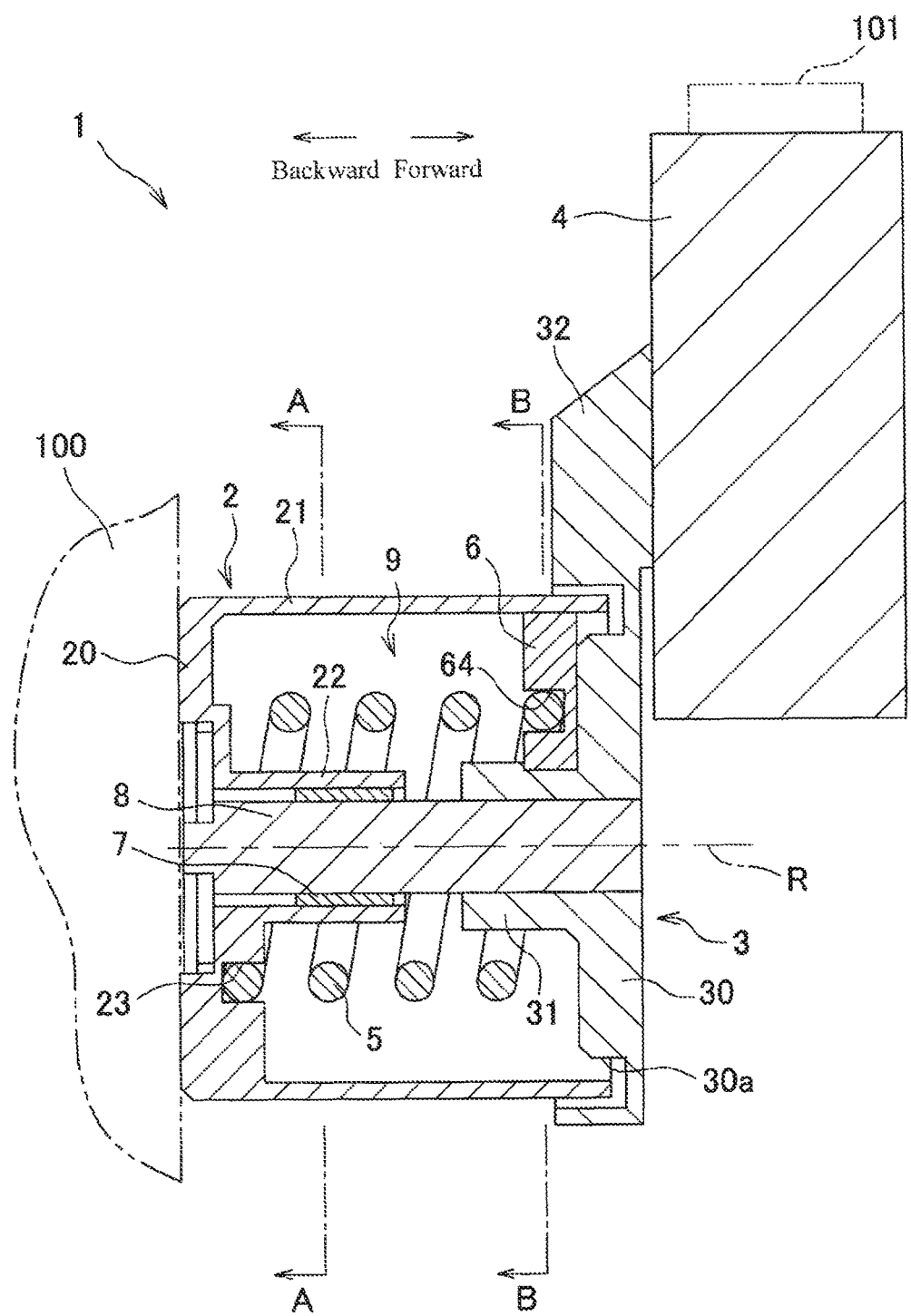

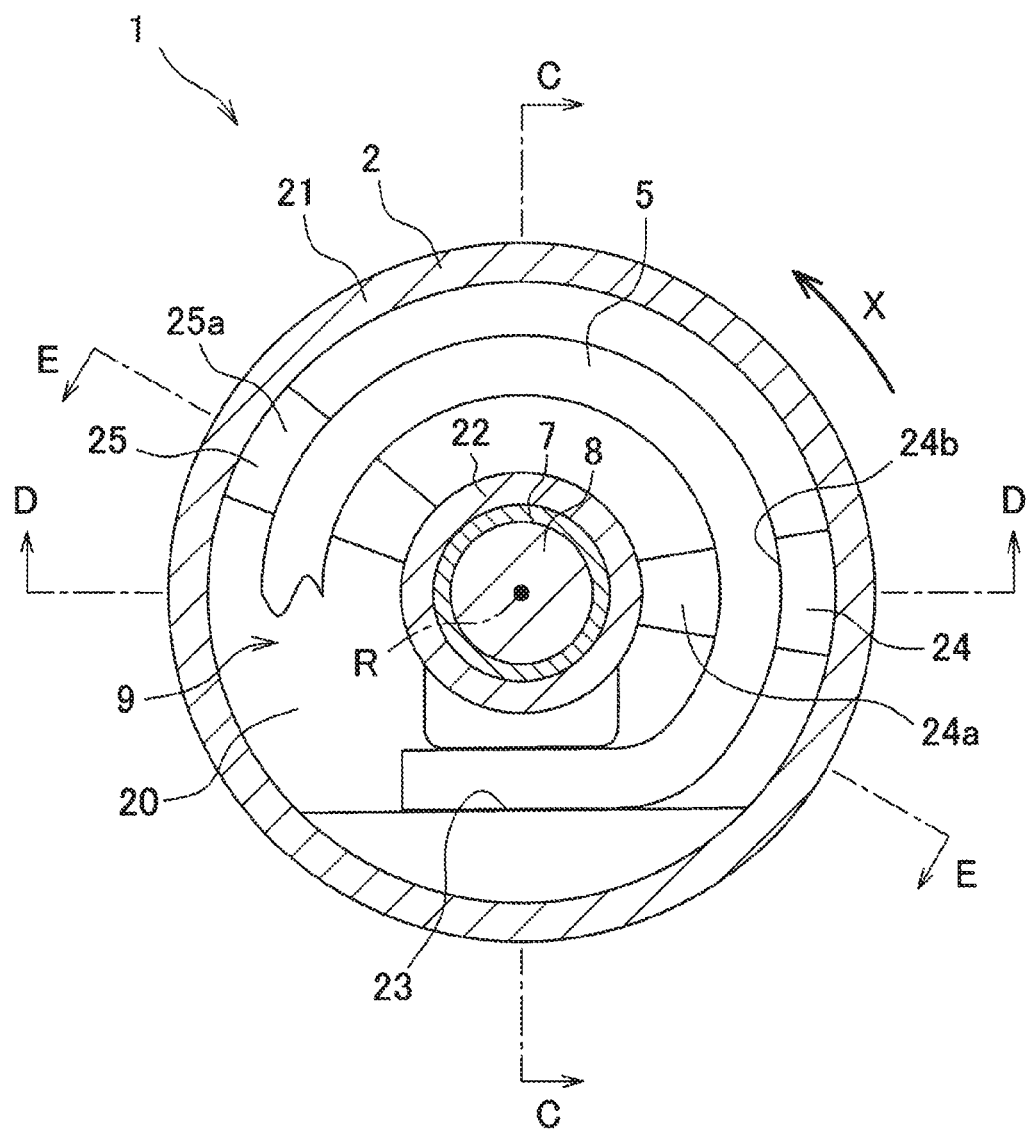
[FIG. 2]

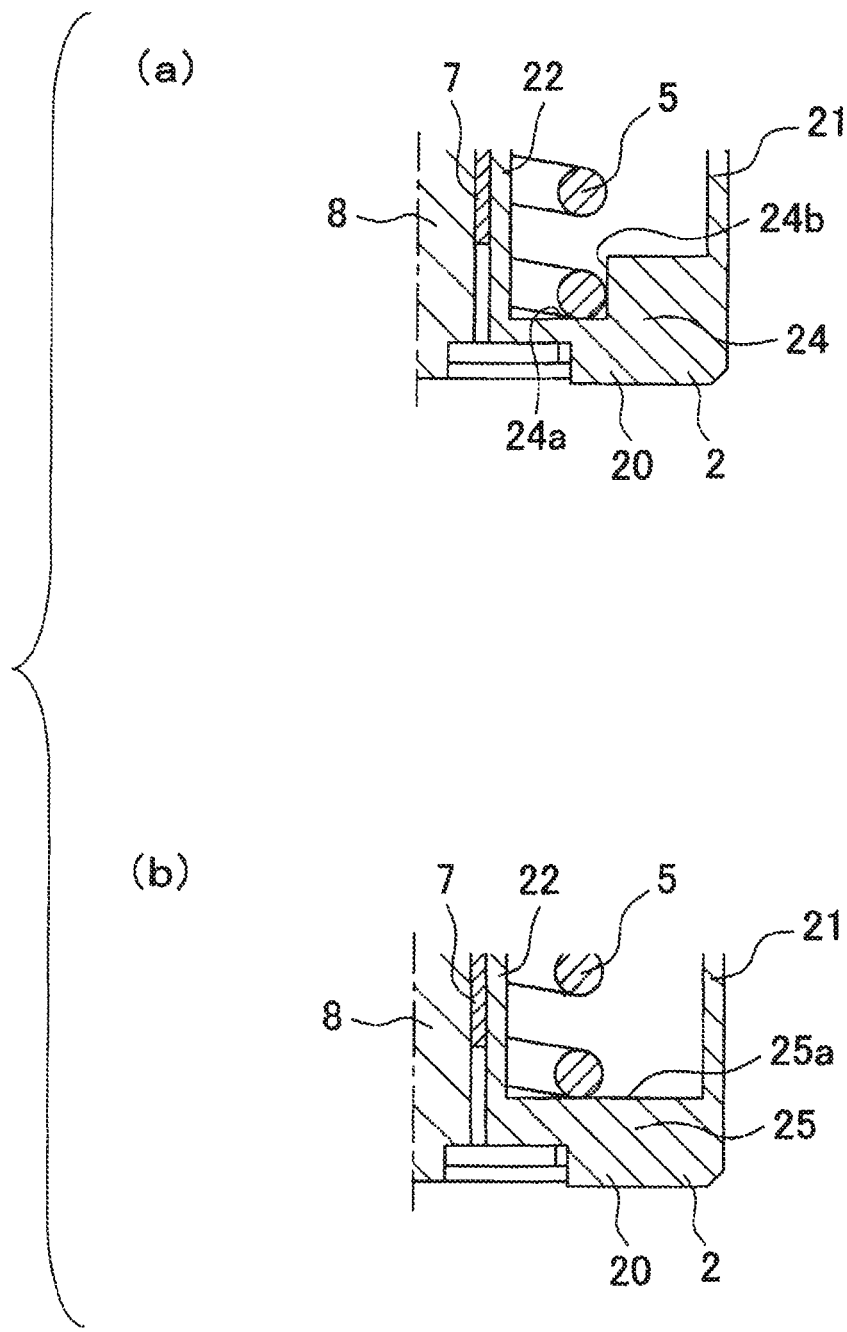
[FIG. 3]

[FIG. 4]
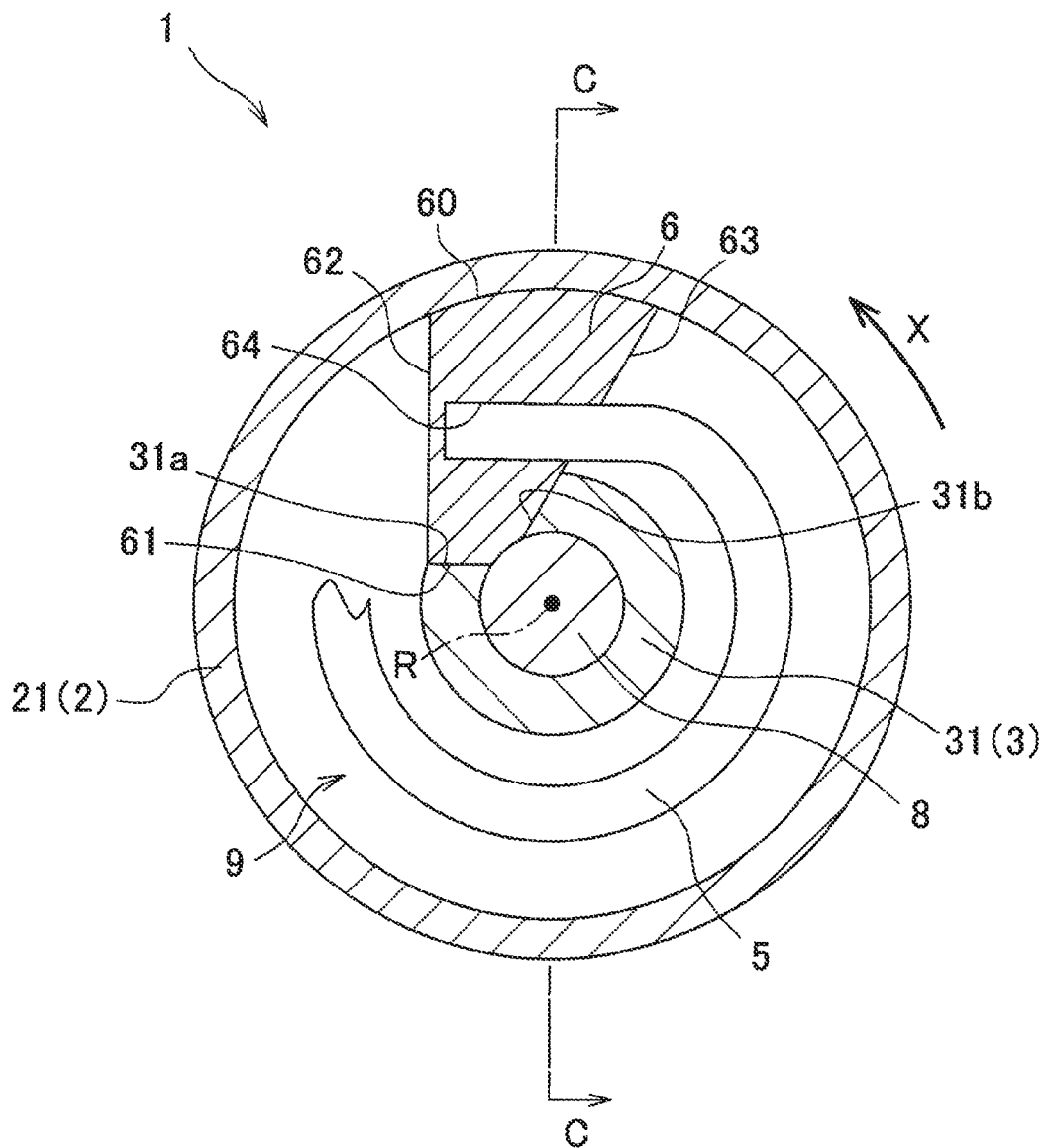

[FIG. 5]
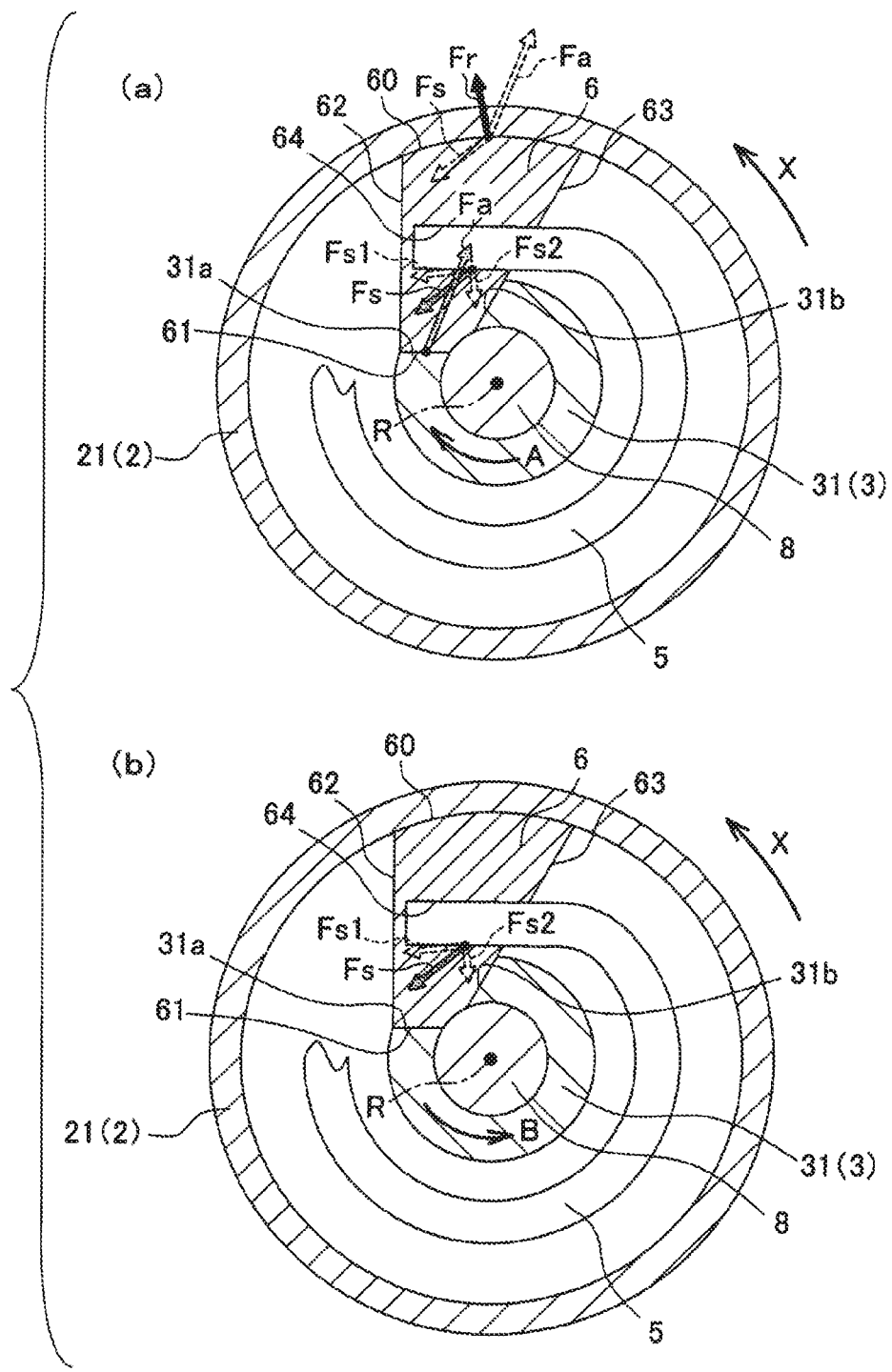

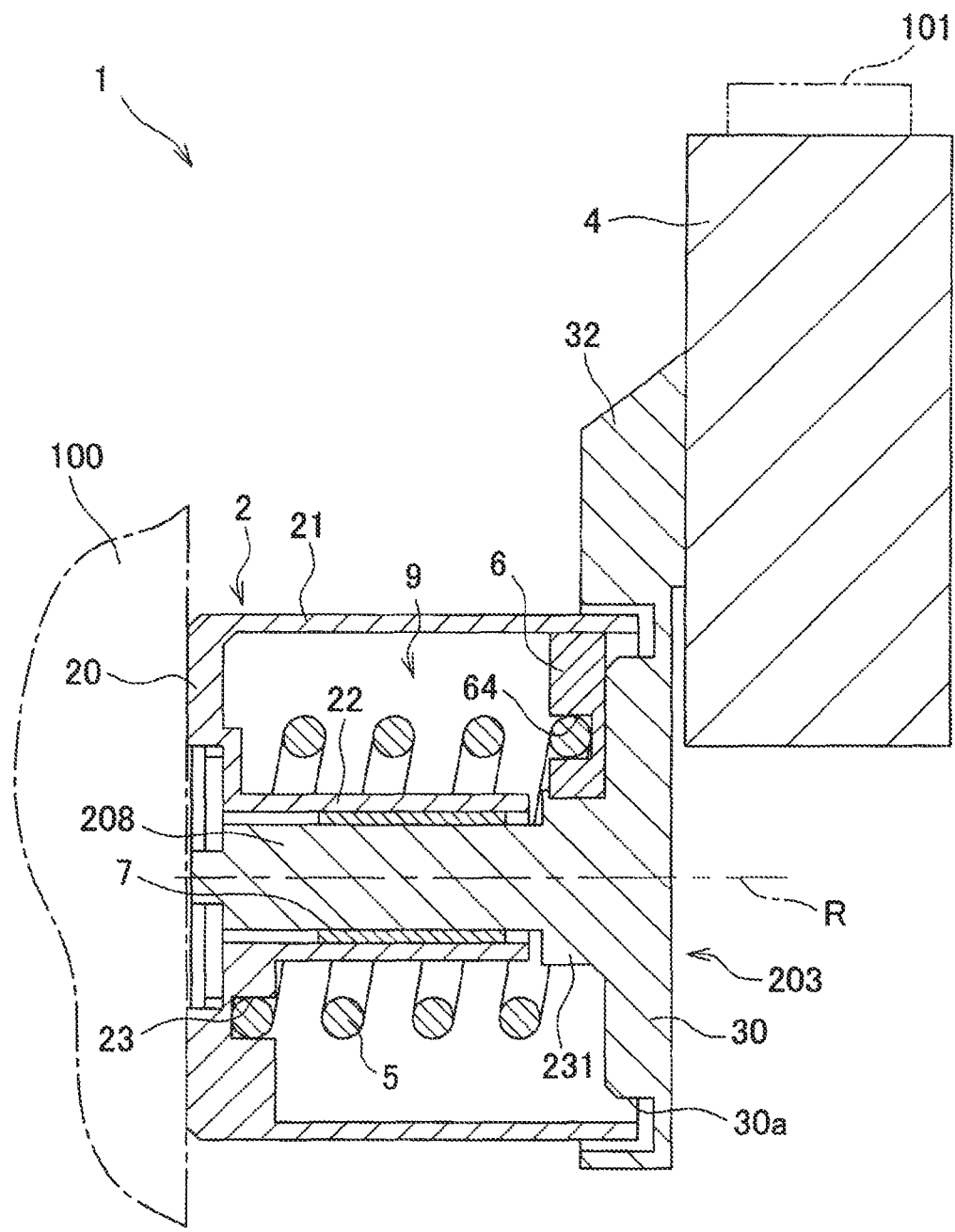
[FIG. 6]

[FIG. 7]
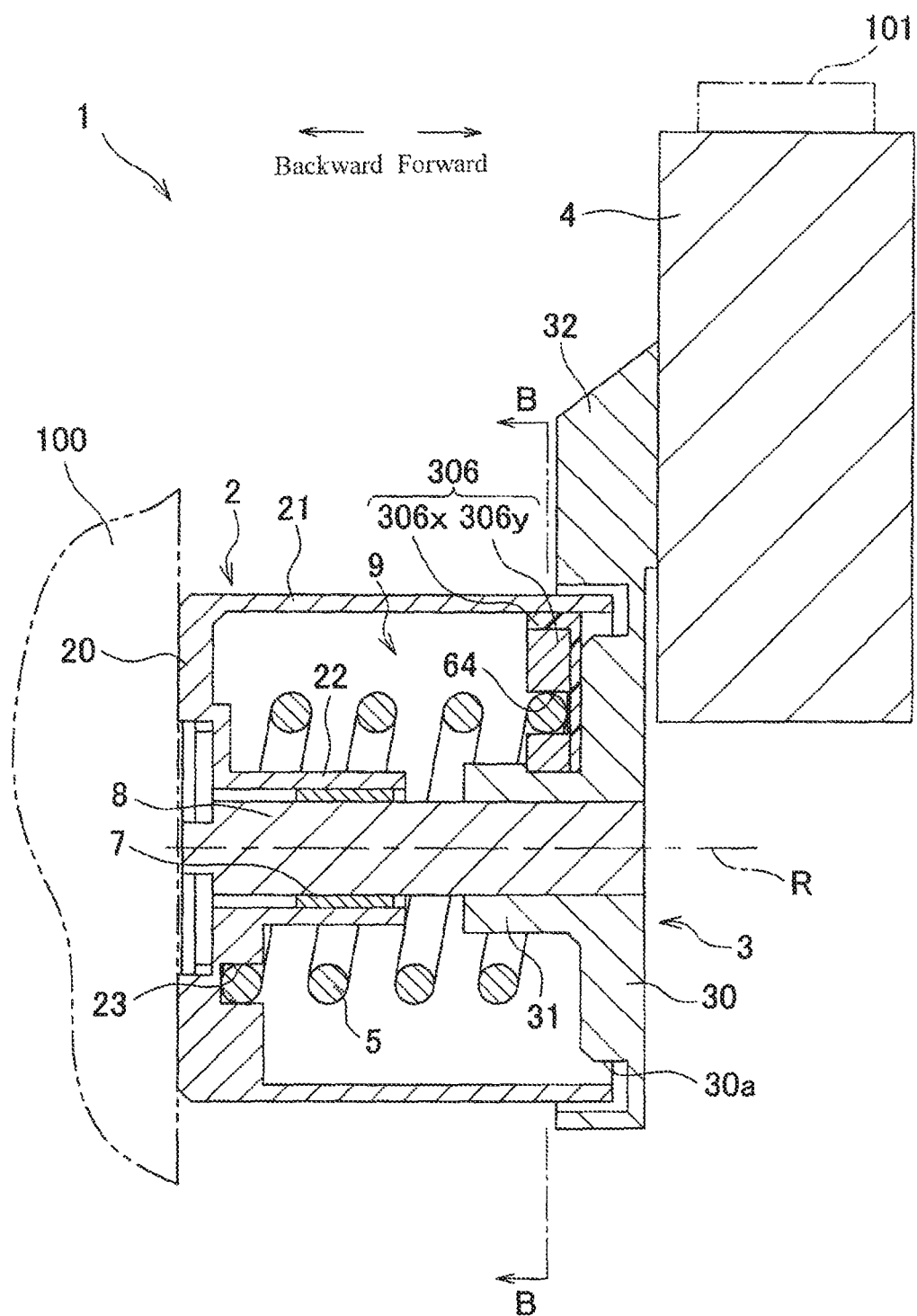

[FIG. 8]
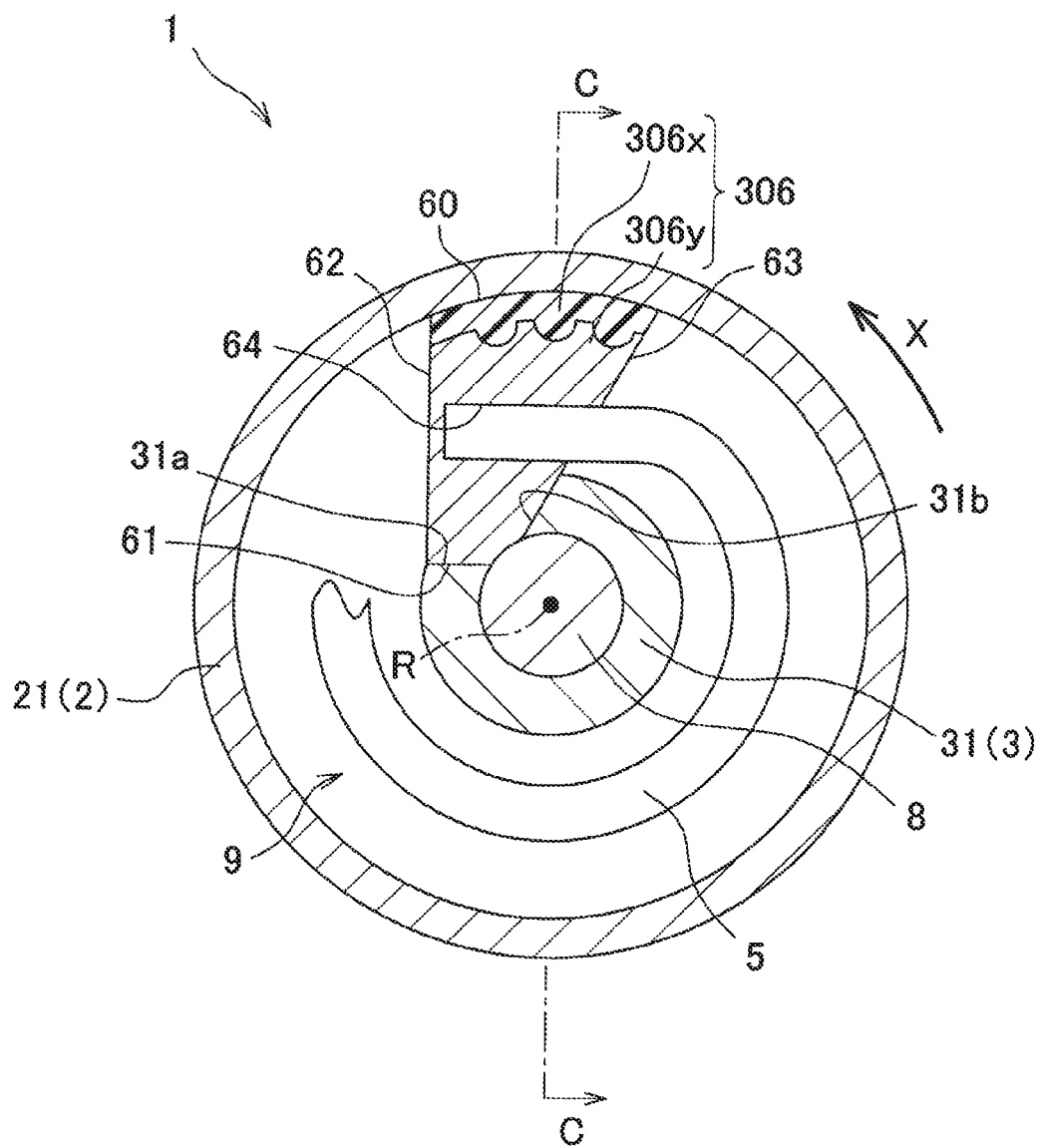

[FIG. 9]
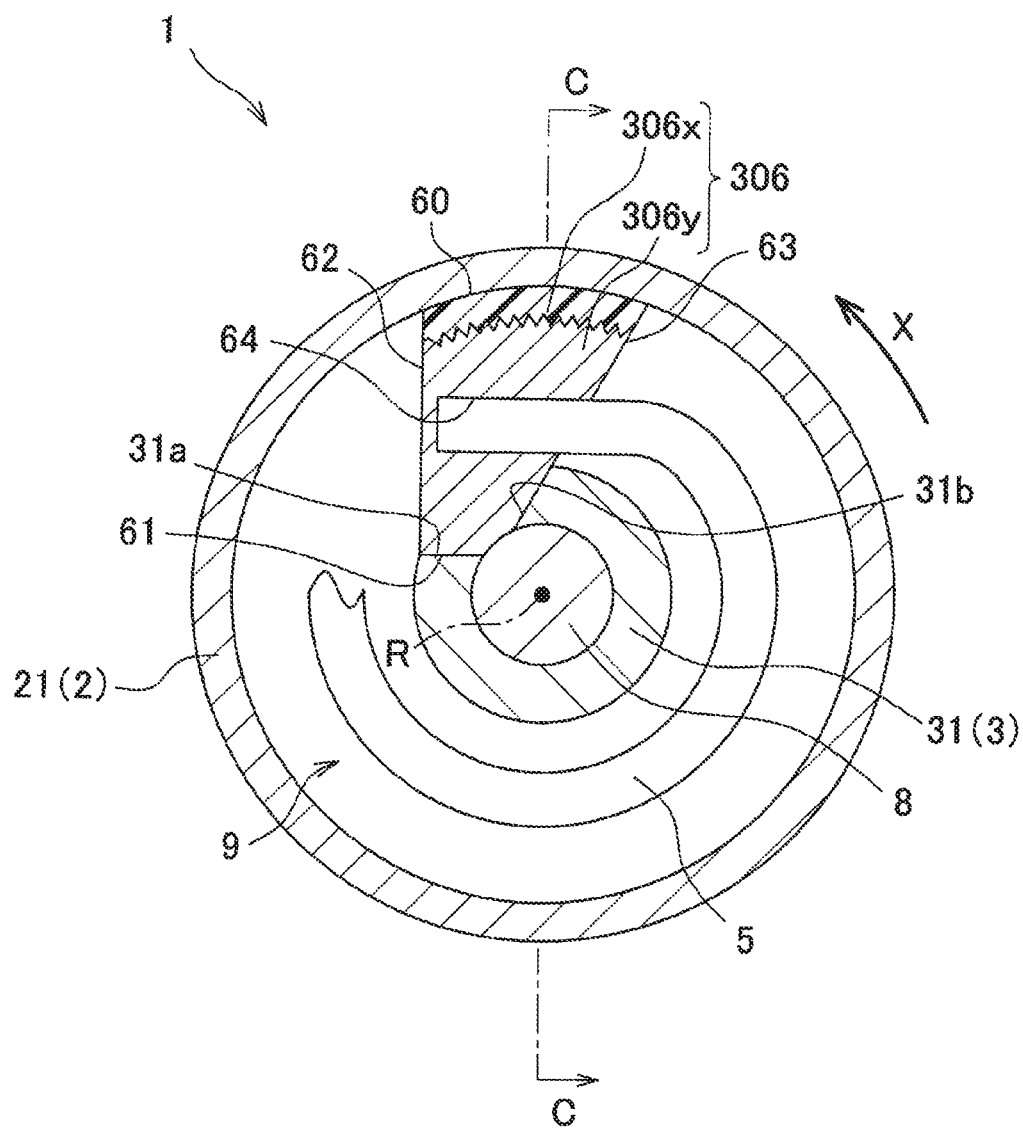

[FIG. 10]
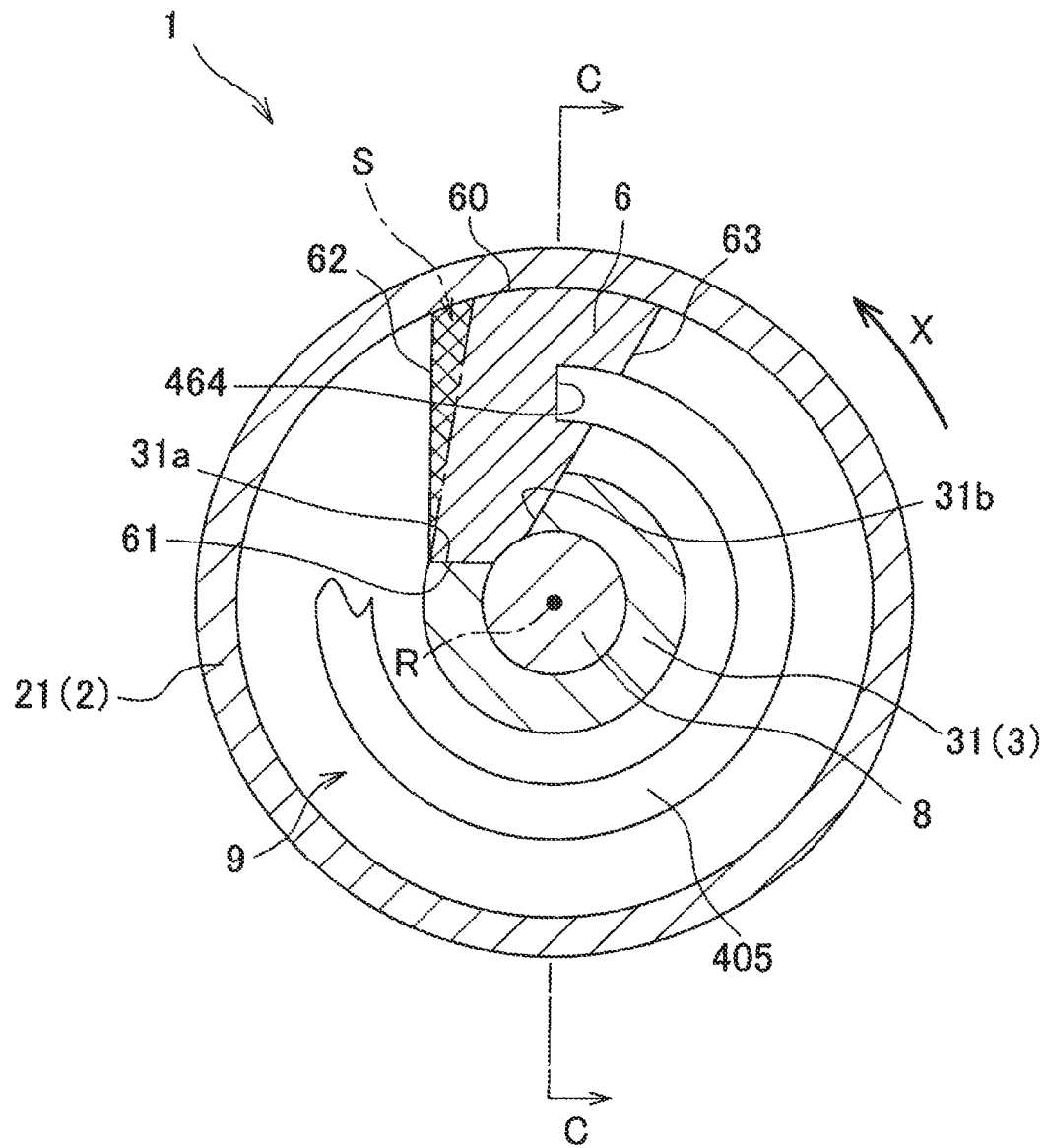

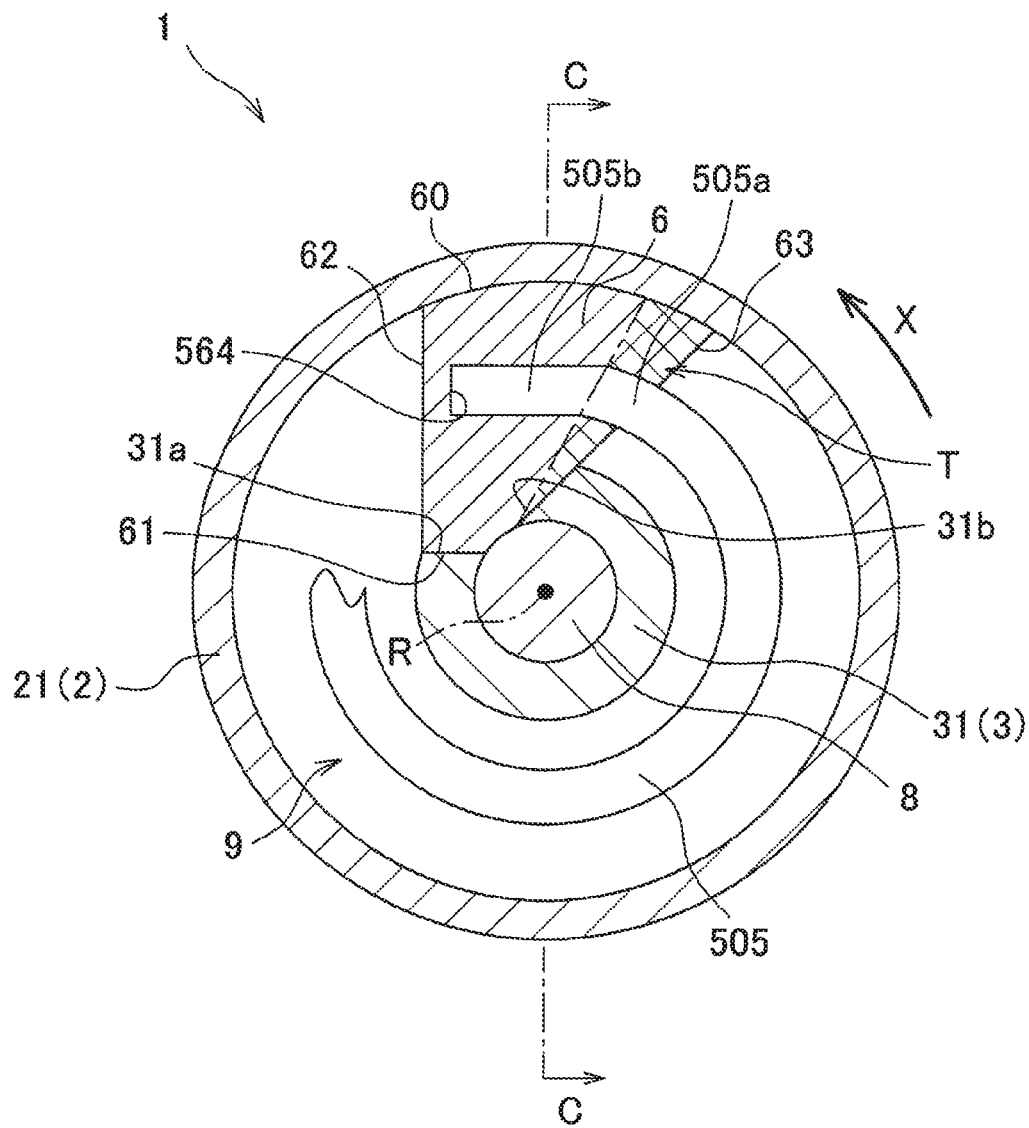
[FIG. 11]

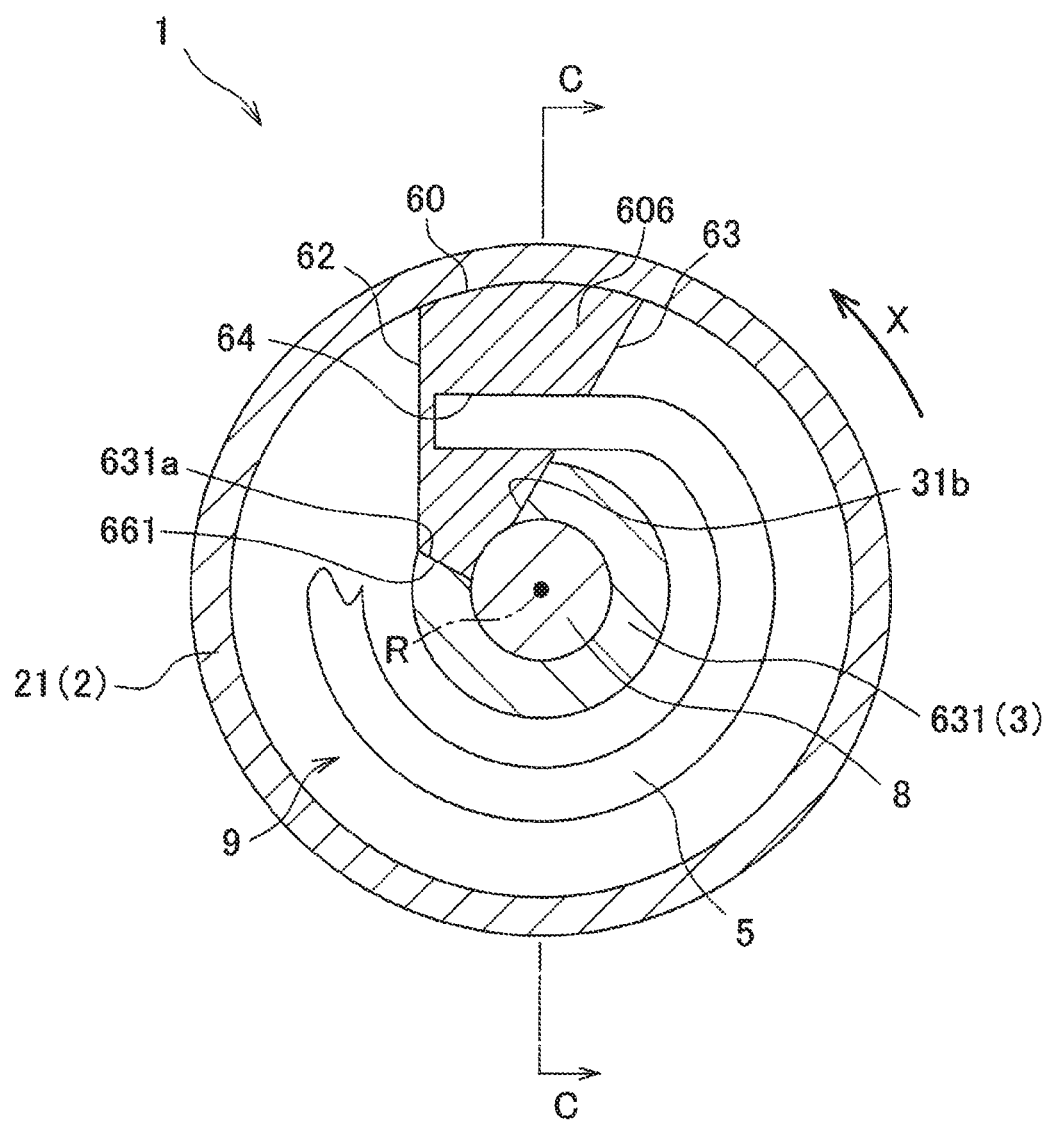
[FIG. 12]

AUTO TENSIONER

CROSS REFERENCE TO RELATED APPLICATIONS:

This is a U.S. National Phase Application under 35 U.S.C. § 371 of International Application No. PCT/JP2015/053871, filed Feb. 12, 2015, which claims priority to Japanese Application Nos. 2014-028133, 2014-262127 and 2015-010210 filed Feb. 18, 2014, Dec. 25, 2014, and Jan. 22, 2015, respectively, and which was published Under PCT Article 21(2), the entire contents of which are incorporated herein by reference.

TECHNICAL FIELD

The present invention relates to an auto-tensioner for automatically maintaining tension of a belt appropriately.

BACKGROUND ART

For example, in a belt for auxiliary machine drive of an automobile engine, belt tension varies due to rotation fluctuation caused by engine combustion. A belt slip occurs due to such variation in belt tension, and thus a problem such as slip sound or belt wear occurs. In order to solve this, conventionally, an auto-tensioner has been adopted as a mechanism to suppress the occurrence of belt slip even if belt tension varies.

For example, an auto-tensioner of Patent Document 1 is provided with: a base having a first cylindrical part; a rotating member which has a second cylindrical part that is disposed inside of the first cylindrical part and is supported so as to be rotatable with respect to the base, and on which a pulley around which a belt is wound can be mounted; a coil spring which is disposed inside of the second cylindrical part and rotationally biases the rotating member in one direction with respect to the base; and a friction member which is disposed between the first cylindrical part and the second cylindrical part, is slidable on the inner circumferential surface of the first cylindrical part, and has a convex portion which is engaged with a concave portion provided in the outer circumferential surface of the second cylindrical part.

Further, an auto-tensioner of Patent Document 2 is provided with: a base; a rotating member supported so as to be rotatable with respect to the base; a coil spring which rotationally biases the rotating member in one direction with respect to the base; a friction member which is disposed between the inner circumferential surface of a cylindrical part provided in the rotating member (or the base) and the coil spring and is slidable on the inner circumferential surface of the cylindrical part; and a leaf spring which is coupled to the friction member and has one end sandwiched between the rotating member (or the base) and an end portion of the coil spring in a circumferential direction.

In the auto-tensioner as in Patent Documents 1 and 2, between the case where belt tension increases and the case where it decreases, the magnitudes of a frictional force which is generated at a sliding surface of the friction member are different from each other, and thus a damping characteristic asymmetrical depending on a rotational direction of the rotating member (asymmetric damping characteristic) is achieved. That is, in the case where belt tension increases, by generating a large frictional force, it is possible to sufficiently damp the oscillation of the rotating member, and in the case where belt tension decreases, a small frictional force is generated, and therefore, it is possible to make the rotating member follow tension fluctuation of the belt.

PRIOR ART DOCUMENT

Patent Document

[Patent Document 1] JP-A-2006-118668
[Patent Document 2] Japanese Patent No. 5276520

SUMMARY OF THE INVENTION

Problems that the Invention is to Solve

However, in the auto-tensioner of Patent Document 1, the second cylindrical part of the rotating member and the friction member are disposed between the first cylindrical part of the base and the coil spring, and furthermore, convex and concave shapes which are engaged with each other are formed in the inner circumferential surface of the second cylindrical part and the friction member. Therefore, there is a problem in that the auto-tensioner increases in size in a radial direction. Further, the second cylindrical part is configured with a metal material, and therefore, there is also a problem in that the auto-tensioner becomes heavy.

In addition, in the auto-tensioner of Patent Document 2, since the thicknesses of the leaf spring and the friction member which are disposed between the cylindrical part of the rotating member (or the base) and the coil spring are relatively thin, an increase in size in a radial direction or an increase in weight can be suppressed. However, the number of parts increases, and therefore, there is a problem in that labor is required for assembling.

Therefore, the present invention has an object to provide an auto-tensioner having a small number of parts, being lightweight and compact, and having an asymmetric damping characteristic.

Means for Solving the Problems

The auto-tensioner according to a first aspect of the present invention contains: a base having a cylindrical part; a rotating member supported so as to be rotatable with respect to the base; a pulley rotatably provided at the rotating member; a friction member which is sandwiched between an inner circumferential surface of the cylindrical part and the rotating member in a radial direction of the cylindrical part; and a coil spring which has one end locked to the friction member and the other end locked to the base and is disposed in a state of being compressed in an axial direction of the cylindrical part, thereby pressing the friction member against the rotating member in the axial direction and rotationally biasing the rotating member in one direction with respect to the base through the friction member, in which the friction member has an arcuate surface capable of sliding along the inner circumferential surface of the cylindrical part, a first locking part which is located further toward the one direction side than the arcuate surface in a circumferential direction of the cylindrical part and locked to the rotating member, and a second locking part which is locked to the one end of the coil spring.

In the auto-tensioner according to a second aspect of the present invention, in the first aspect, the second locking part of the friction member is located further toward the outside in the radial direction than the first locking part and further toward the opposite direction side to the one direction in the circumferential direction than the first locking part.

In the auto-tensioner according to a third aspect of the present invention, in the first or second aspect, the friction member contains a first part and a second part having a higher surface hardness than the first part, the first part configures the arcuate surface and a surface which continues to the arcuate surface and comes into contact with the rotating member in the axial direction in the friction member, and the second part configures the first locking part and the second locking part.

In the auto-tensioner according to a fourth aspect of the present invention, in the third aspect, the first part and the second part are configured so as to mesh with each other in the circumferential direction.

In the auto-tensioner according to a fifth aspect of the present invention, in any one of the first to fourth aspects, the one end of the coil spring has an arc shape.

In the auto-tensioner according to a sixth aspect of the present invention, in any one of the first to fourth aspects, the one end of the coil spring contains an arc-shaped portion and a linear portion.

In the auto-tensioner according to a seventh aspect of the present invention, in any one of the first to sixth aspects, the base has a pedestal part provided inside of one end portion of the cylindrical part, and the pedestal part has an end portion retaining means for retaining the other end portion of the coil spring, and a posture supporting means for supporting a portion further on the one end side than a portion retained by the end portion retaining means in a first turn region on the other end portion side of the coil spring, in the axial direction and the radial direction.

In the auto-tensioner according to an eighth aspect of the present invention, in any one of the first to seventh aspects, the first locking part is inclined with respect to the radial direction so as to face the one direction side as it goes toward the outside in the radial direction.

In the auto-tensioner according to a ninth aspect of the present invention, in any one of the first to seventh aspects, the first locking part is inclined with respect to the radial direction so as to face the opposite direction side to the one direction as it goes toward the outside in the radial direction.

Advantageous Effect of the Invention

According to the first aspect of the present invention, in the case where belt tension increases, whereby the rotating member rotates against the biasing force of the coil spring, the arcuate surface of the friction member slides on the inner circumferential surface of the cylindrical part of the base and a frictional force is generated between the arcuate surface of the friction member and the inner circumferential surface of the cylindrical part of the base. The arcuate surface of the friction member is located further toward the opposite direction side to a rotational biasing direction (the one direction) of the coil spring, that is, the rotational direction side of the rotating member, than the first locking part of the friction member in the circumferential direction. For this reason, a force that the first locking part of the friction member received from the rotating member can be used as a force pressing the arcuate surface of the friction member against the inner circumferential surface of the cylindrical part of the base. Therefore, it is possible to generate a large frictional force between the arcuate surface of the friction member and the inner circumferential surface of the cylindrical part of the base, and thus it is possible to generate a large damping force sufficiently damping the oscillation of the rotating member.

Conversely, in the case where belt tension decreases, whereby the rotating member is rotated by the biasing force of the coil spring, the friction member receives a biasing force in the circumferential direction from the coil spring. However, the arcuate surface of the friction member is located further toward the opposite direction side to the rotational biasing direction of the coil spring than the first locking part of the friction member in the circumferential direction, and therefore, the arcuate surface of the friction member is not pressed against the inner circumferential surface of the cylindrical part of the base by the biasing force in the circumferential direction of the coil spring and an increase in the frictional force between the arcuate surface of the friction member and the inner circumferential surface of the cylindrical part of the base can be suppressed. Therefore, it is possible to generate a small frictional force between frictional force between the arcuate surface of the friction member and the inner circumferential surface of the cylindrical part of the base and it is possible to make the oscillation of the rotating member sufficiently follow the decrease in belt tension.

Further, the auto-tensioner according to the present invention realizes the above-described asymmetric damping characteristic by using only the friction member and the coil spring, and therefore, it is lightweight and has a small number of parts, and assembling thereof is easy. Furthermore, one end portion of the coil spring is locked to the friction member sandwiched in the radial direction between the cylindrical part of the base and the rotating member, and therefore, it is not necessary to secure a large space between the coil spring and the cylindrical part of the base, and thus the auto-tensioner can be downsized.

According to the second aspect of the present invention, the arcuate surface of the friction member is formed further toward the opposite direction side to the rotational biasing direction (the one direction) of the coil spring than the first locking part, and therefore, the second locking part is also formed further toward the opposite direction side to the rotational biasing direction of the coil spring than the first locking part, whereby the friction member can be downsized in the circumferential direction, as compared to a case where the first locking part is formed within the range in the circumferential direction of the second locking part.

According to the third aspect of the present invention, the first locking part and the second locking part are configured with the second part having a relatively high surface hardness, and therefore, even in the case where a force acting on the first locking part and the second locking part increases according to an increase in belt tension, damage to (deformation or depression of) the first locking part and the second locking part can be prevented. Furthermore, since damage to the first locking part and the second locking part is prevented, application on a high-load drive system in which large belt tension is required, or realization of such as downsizing of the friction member is also possible.

The first part configures the arcuate surface and a surface which continues to the arcuate surface and comes into contact with the rotating member in the axial direction in the friction member, and is made such that falling-off in the axial direction is prevented.

According to the fourth aspect of the present invention, the first part and the second part can be disposed so as to be immovable with respect to one another in the circumferential direction even without performing adhesion by an adhesive, fixing by a rivet or the like and can be easily assembled.

According to the fifth aspect of the present invention, since one end of the coil spring does not have a linear portion, the length of the coil spring can be shortened, and therefore, the size of the second locking part can be reduced, whereby the friction member can be downsized in the circumferential direction. Furthermore, a further reduction in the weight of the auto-tensioner can be realized by the shortening of the length of the coil spring and the downsizing of the friction member in the circumferential direction. Since working such as bending one end of the coil spring is not required, simplification of a manufacturing process and a reduction in manufacturing cost can be realized.

According to the sixth aspect of the present invention, since the size of the second locking part becomes larger, as compared to a case where one end of the coil spring has only an arc-shaped portion or a case where it has only a linear portion, the large area of the arcuate surface can be secured and the wear of the arcuate surface can be suppressed.

According to the seventh aspect of the present invention, the portion further on the one end side than the portion retained by the end portion retaining means in the first turn region on the other end portion side of the coil spring is supported by the posture supporting means in the axial direction and the radial direction, and therefore, the coil spring can be stably torsionally deformed.

According to the eighth aspect of the present invention, assembling of the friction member is easy.

According to the ninth aspect of the present invention, in the case where belt tension decreases, the friction member can be more reliably prevented from coming out in the circumferential direction.

BRIEF DESCRIPTION OF DRAWINGS

FIG. 1 is a cross-sectional view of an auto-tensioner of a first embodiment of the present invention.

FIG. 2 is a cross-sectional view along line A-A of FIG. 1.

FIG. 3 is a diagram illustrating partial cross-sectional views of FIG. 2: (a) of FIG. 3 is a cross-sectional view along line D-D of FIG. 2 and (b) of FIG. 3 is a cross-sectional view along line E-E of FIG. 2.

FIG. 4 is a cross-sectional view along line B-B of FIG. 1.

FIG. 5 is a diagram for explaining a force which acts on a friction member when belt tension has been changed: (a) of FIG. 5 is a diagram illustrating a force which acts on the friction member when the belt tension has increased and (b) of FIG. 5 is a diagram illustrating a force which acts on the friction member when the belt tension has decreased.

FIG. 6 is a cross-sectional view corresponding to FIG. 1, of an auto-tensioner of a second embodiment of the present invention.

FIG. 7 is a cross-sectional view corresponding to FIG. 1, of an auto-tensioner of a third embodiment of the present invention.

FIG. 8 is a cross-sectional view along line B-B of FIG. 7.

FIG. 9 is a cross-sectional view along line B-B of FIG. 7 in a modification example of the third embodiment of the present invention.

FIG. 10 is a cross-sectional view corresponding to FIG. 4, of an auto-tensioner of a fourth embodiment of the present invention.

FIG. 11 is a cross-sectional view corresponding to FIG. 4, of an auto-tensioner of a fifth embodiment of the present invention.

FIG. 12 is a cross-sectional view corresponding to FIG. 4, of an auto-tensioner of a sixth embodiment of the present invention.

MODE FOR CARRYING OUT THE INVENTION

Next, an embodiment of the present invention will be described. This embodiment is an example in which the present invention is applied particularly to an auto-tensioner for maintaining constant loose-side tension of a transmission belt 101 which drives an auxiliary machine of an automobile engine.

An auto-tensioner of this embodiment is used in an auxiliary machine drive system in which a transmission belt is wound around a drive pulley (not illustrated) coupled to a crankshaft of an automobile engine, and a driven pulley (not illustrated) which drives an auxiliary machine such as an alternator. Specifically, a pulley 4, which is described later, of the auto-tensioner is disposed so as to come into contact with the loose side of the transmission belt. This auxiliary machine drive system is made such that the rotation of the crankshaft is transmitted to the driven pulley through the transmission belt, whereby the auxiliary machine is driven.

As illustrated in FIG. 1, an auto-tensioner 1 of a first embodiment of the present invention is provided with a base 2 which is fixed to an engine block 100 illustrated by a two-dot chain line in FIG. 1, a rotating member 3 supported so as to be rotatable about an axis R with respect to the base 2, the pulley 4 rotatably provided at the rotating member 3, a coil spring 5, and a friction member 6. The leftward direction in FIG. 1 is defined as a backward direction and the rightward direction is defined as a forward direction. A radial direction centered on the axis R is defined simply as a radial direction and a circumferential direction around the axis R is defined simply as a circumferential direction.

The base 2 is, for example, a metal part made of an aluminum alloy casting or the like, and is provided with an annular pedestal part 20 which is fixed to the engine block 100, an outer cylindrical part (cylindrical part) 21 extending forward from an outer edge portion of the pedestal part 20, and an inner cylindrical part 22 extending forward from a central portion of the pedestal part 20. A shaft 8 extending in a front-back direction (a direction of the axis R) is rotatably inserted inside of the inner cylindrical part 22 with a bearing 7 interposed therebetween.

A spring accommodation chamber 9 is formed between the inner cylindrical part 22 and a protrusion portion 31, which is described later, of the rotating member 3, and the outer cylindrical part 21. The coil spring 5 is disposed in the spring accommodation chamber 9. As illustrated in FIG. 2 and FIG. 4, the coil spring 5 is coiled in a spiral shape in an X-direction toward a front end portion (one end) from a rear end portion (the other end). FIG. 1 is a cross-sectional view along line C-C illustrated in FIG. 2 and FIG. 4.

As illustrated in FIG. 1 and FIG. 2, a retention groove (end portion retaining means) 23 which retains (locks) the rear end portion (the other end) of the coil spring 5 is formed in the front face of the pedestal part 20. The rear end of the coil spring 5 is bent in a direction directed inward in the radial direction in the vicinity of the rear end, and a portion further on the rear end side than the bent portion extends linearly. The linear portion is retained in the retention groove 23. The rear end portion of the coil spring 5 is sandwiched between both side surfaces of the retention groove 23 in the radial direction and is in contact with the bottom face of the retention groove 23.

Furthermore, the rear end face of the coil spring 5 is not in contact with any member. However, the vicinity of the bent portion in the linearly extending portion of the rear end portion of the coil spring 5 is held by the retention groove 23 in the radial direction, and therefore, the rear end portion of the coil spring 5 can be prevented from moving by an elastic restoring force due to torsional deformation.

In addition, two posture support parts (posture supporting means) 24 and 25 protruding forward are formed at intervals in the circumferential direction on the front face of the pedestal part 20. The posture support parts 24 and 25 are located away from the retention groove 23 in the circumferential direction and are arranged in this order in the X-direction from the retention groove 23. As illustrated in (a) of FIG. 3, the posture support part 24 has an axial direction supporting surface 24a approximately orthogonal to the axis R, and a radial direction supporting surface 24b along the circumferential direction. As illustrated in (b) of FIG. 3, the posture support part 25 has an axial direction supporting surface 25a approximately orthogonal to the axis R.

The rear face of the coil spring 5 comes into contact with the axial direction supporting surfaces 24a and 25a, and the radially outer surface around the axis R of the coil spring 5 comes into contact with the radial direction supporting surface 24b. Therefore, a portion further on the front end portion side than the portion retained by the retention groove 23 in a first turn region on the rear end side of the coil spring 5 is supported in the axial direction and the radial direction by the two posture support parts 24 and 25. In this way, the coil spring 5 can be stably torsionally deformed. The posture support part 24 and the posture support part 25 are included in the posture supporting means in the present invention.

The rotating member 3 is provided with a disk part 30 which is disposed in front of the outer cylindrical part 21 of the base 2, the protrusion portion 31 extending rearward from a central portion of the disk part 30, and a pulley support part 32 formed to overhang from a portion of an outer edge of the disk part 30. The rotating member 3 is also a metal part made of an aluminum alloy casting or the like, similar to the base 2 described above.

A hole extending in the front-back direction is formed in central portions of the disk part 30 and the protrusion portion 31, and the shaft 8 is inserted into the hole so as to be relatively non-rotatable. Therefore, the rotating member 3 is rotatably supported on the base 2 through the shaft 8.

The pulley 4 is rotatably mounted on the pulley support part 32. The transmission belt 101 is wound around the pulley 4. The pulley 4 (and the rotating member 3) oscillates with the axis R as an oscillation center according to increase and decrease of the tension of the transmission belt 101. In FIG. 1, illustration of the internal structure of the pulley 4 is omitted.

An annular groove 30a in which a front end portion of the outer cylindrical part 21 of the base 2 is accommodated is formed in the vicinity of an outer edge of the rear face of the disk part 30. In the rear face of the disk part 30, a portion further on the outside in the radial direction than the protrusion portion 31 and further on the inside in the radial direction than the annular groove 30a is formed in a flat shape perpendicular to the axis R.

The protrusion portion 31 is formed in a substantially cylindrical shape. As illustrated in FIG. 4, a fan-shaped cutout is formed in a front-side portion of the protrusion portion 31. Both sides in the circumferential direction of the cutout are configured as a locking surface 31a and a contact surface 31b. When viewed from the direction of the axis R, the locking surface 31a intersects a straight line passing through an arbitrary point of the locking surface 31a and the axis R. That is, the locking surface 31a is inclined with respect to the radial direction. More specifically, the locking surface 31a is inclined with respect to the radial direction so as to face in the X-direction as it goes toward the outside in the radial direction. Furthermore, the contact surface 31b is inclined with respect to the radial direction so as to face in the opposite direction to the X-direction as it goes toward the outside in the radial direction.

The friction member 6 is sandwiched between the inner circumferential surface of the outer cylindrical part 21 of the base 2 and the protrusion portion 31 of the rotating member 3 in the radial direction. The length in the front-back direction of the friction member 6 is approximately the same as the length in the front-back direction of each of the locking surface 31a and the contact surface 31b. The front face of the friction member 6 has a flat shape and the whole face or a portion thereof comes into contact with the rear face of the disk part 30 of the rotating member 3.

The friction member 6 is formed of a material having high lubricity, which is obtained by compounding fibers, a filler, a solid lubricant, or the like with synthetic resin. As the synthetic resin configuring the friction member 6, for example, thermoplastic resin such as polyamide, polyacetal, polytetrafluoroethylene, polyphenylene sulfide, or ultra-high molecular weight polyethylene, or thermosetting resin such as phenol can be used. As long as the front face and an arcuate surface 60, which is described later, are configured with the above-described material, the friction member 6 may include a material other than the above-described material (refer to, e.g., a third embodiment).

The friction member 6 has a substantially fan-shaped cross-sectional shape orthogonal to the axis R and has the arcuate surface 60, a locking surface 61 opposed to the arcuate surface 60, and two side surfaces 62 and 63 opposed to each other in the circumferential direction. The arcuate surface 60 is formed in substantially the same curvature as the inner circumferential surface of the outer cylindrical part 21 and is slidable along the inner circumferential surface of the outer cylindrical part 21. The locking surface (a first locking part) 61 comes into contact with the locking surface 31a of the protrusion portion 31 of the rotating member 3. A radially inner end portion of the side surface 63 on the opposite direction side to the X-direction, out of the two side surfaces 62 and 63, comes into contact with the contact surface 31b of the protrusion portion 31 of the rotating member 3.

The locking surface 61 is located further toward the X-direction side than the arcuate surface 60 in the circumferential direction. The locking surface 61 is inclined with respect to the radial direction so as to face the X-direction side as it goes toward the outside in the radial direction. The two side surfaces 62 and 63 are inclined with respect to the radial direction so as to face the opposite direction side to the X-direction as they go toward the outside in the radial direction. The side surface 62 on the X-direction side out of the side surfaces 62 and 63 is approximately orthogonal to the locking surface 61.

In a state where an external force does not act on the friction member 6, the length in a direction orthogonal to the locking surface 61 from the locking surface 61 to the arcuate surface 60 is slightly larger than the distance in a direction orthogonal to the locking surface 31a from the locking surface 31a of the rotating member 3 to the inner circumferential surface of the outer cylindrical part 21 of the base 2. Therefore, the friction member 6 is disposed between the protrusion portion 31 of the rotating member 3 and the outer cylindrical part 21 of the base 2 in a state of being slightly compressed in a direction approximately orthogonal to the locking surface 61.

A retention groove (a second locking part) 64 which retains (locks) the front end portion (one end) of the coil spring 5 is formed in the rear face of the friction member 6. The front end portion of the coil spring 5 is bent in the vicinity of the tip, similar to the rear end portion, and a portion further on the tip side than the bent portion extends linearly. The linear portion is retained in the retention groove 64. The retention groove 64 is located further toward the outside in the radial direction than the locking surface 61 and is located further toward the opposite direction side to the X-direction than the locking surface 61 in the circumferential direction.

The coil spring 5 is disposed in a state of being compressed in the direction of the axis R (the front-back direction). For this reason, the coil spring 5 presses the friction member 6 against the rear face of the disk part 30 of the rotating member 3 by an elastic restoring force in the direction of the axis R.

Furthermore, the coil spring 5 is disposed in a state of being twisted in a diameter expansion direction. For this reason, the coil spring 5 rotationally biases the rotating member 3 through the friction member 6 in the X-direction, that is, a direction increasing the tension of the transmission belt 101 by pressing the pulley 4 against the transmission belt 101, by an elastic restoring force in the circumferential direction.

Next, an operation of the auto-tensioner 1 will be described. In the case where the tension of the transmission belt 101 increases, the rotating member 3 rotates in a direction of an arrow A illustrated in (a) of FIG. 5 (the opposite direction to the X-direction), against the biasing force in the circumferential direction of the coil spring 5. The friction member 6 rotates in the direction of the arrow A under a force Fa from the locking surface 31a of the rotating member 3, and the arcuate surface 60 of the friction member 6 slides on the inner circumferential surface of the outer cylindrical part 21 of the base 2.

The arcuate surface 60 of the friction member 6 is located further toward the opposite direction side to the X-direction (the direction side of the arrow A) in the circumferential direction than the locking surface 61 of the friction member 6. In this embodiment, a tangential direction at an arbitrary point of the locking surface 61 and the arcuate surface 60 intersect one another. The force Fa that the locking surface 61 of the friction member 6 receives from the rotating member 3 is a force in a tangential direction in the locking surface 61, and therefore, the arcuate surface 60 exists on a straight line in a direction of the force Fa from the locking surface 61. For this reason, the force Fa that the locking surface 61 of the friction member 6 receives from the rotating member 3 can be used as a force pressing the arcuate surface 60 of the friction member 6 against the inner circumferential surface of the outer cylindrical part 21 of the base 2.

Furthermore, the friction member 6 receives an elastic restoring force (hereinafter referred to as a "torsional restoring force") Fs caused by the torsional deformation in the diameter expansion direction of the coil spring 5. The torsional restoring force Fs is the resultant force of a component force Fs1 in the X-direction and a component force Fs2 in the diameter contraction direction.

Therefore, a resultant force Fr of the force Fa received from the rotating member 3 and the torsional restoring force Fs of the coil spring 5 acts on the friction member 6. The force Fa is larger than the torsional restoring force Fs, and therefore, the resultant force Fr becomes a radially outward force, and the arcuate surface 60 of the friction member 6 is pressed against the inner circumferential surface of the outer cylindrical part 21 of the base 2 by the resultant force Fr. For this reason, it is possible to generate a large frictional force between the arcuate surface 60 of the friction member 6 and the outer cylindrical part 21 of the base 2, and thus it is possible to generate a large damping force sufficiently damping the oscillation of the rotating member 3.

Conversely, in the case where the tension of the transmission belt 101 decreases, the rotating member 3 rotates in a direction of an arrow B illustrated in (b) of FIG. 5 (the same direction as the X-direction) due to the torsional restoring force Fs of the coil spring 5, and thus the pulley 4 oscillates so as to restore belt tension. The friction member 6 rotates in the direction of the arrow B under the torsional restoring force Fs from the coil spring 5, and the arcuate surface 60 of the friction member 6 slides on the inner circumferential surface of the outer cylindrical part 21 of the base 2. The friction member 6 is biased radially inward by the component force Fs2 in the diameter contraction direction of the torsional restoring force Fs, and therefore, the frictional force which is generated between the arcuate surface 60 of the friction member 6 and the inner circumferential surface of the outer cylindrical part 21 of the base 2 is small.

In the case where the end portion on the X-direction side of the arcuate surface 60 extends to the range in the circumferential direction of the locking surface 61, the arcuate surface 60 of the friction member 6 can be pressed against the inner circumferential surface of the outer cylindrical part 21 by the component force Fs1 in the circumferential direction of the torsional restoring force Fs of the coil spring 5. However, in this embodiment, the arcuate surface 60 of the friction member 6 is located further toward the opposite direction side to the X-direction in the circumferential direction than the locking surface 61 of the friction member 6, and therefore, the arcuate surface 60 of the friction member 6 is not pressed against the inner circumferential surface of the outer cylindrical part 21 by the component force Fs1 in the circumferential direction of the torsional restoring force Fs of the coil spring 5 and an increase in the frictional force between the arcuate surface 60 of the friction member 6 and the inner circumferential surface of the outer cylindrical part 21 can be prevented.

Therefore, a smaller frictional force than that in a case where the rotating member 3 rotates in the direction of the arrow A is generated between the arcuate surface 60 of the friction member 6 and the inner circumferential surface of the outer cylindrical part 21 of the base 2, and therefore, the rotating member 3 can sufficiently receive the torsional restoring force of the coil spring 5 and it is possible to make the oscillation of the rotating member 3 sufficiently follow a decrease in belt tension.

Furthermore, in light of the arcuate surface 60 of the friction member 6 being located further toward the opposite direction side to the X-direction than the locking surface 61 and the friction member 6 being biased radially inward by the component force Fs2 in the diameter contraction direction of the torsional restoring force Fs of the coil spring 5, the friction member 6 moves in the circumferential direction by the component force Fs1 in the circumferential direction of the torsional restoring force Fs of the coil spring 5, whereby the locking surface 61 can be prevented from deviating from the locking surface 31*a* of the rotating member 3.

Furthermore, since the auto-tensioner 1 of this embodiment realizes an asymmetric damping characteristic by only the friction member 6 and the coil spring 5, it is lightweight and the number of parts is fewer, whereby assembling is easy. In addition, the front end portion of the coil spring 5 is locked to the friction member 6 sandwiched between the outer cylindrical part 21 of the base 2 and the rotating member 3 in the radial direction, and therefore, it is not necessary to secure a large space between the coil spring 5 and the outer cylindrical part 21 of the base 2, and thus the auto-tensioner can be downsized.

In this embodiment, the arcuate surface 60 of the friction member 6 is formed further toward the opposite direction side to the X-direction than the locking surface 61, and therefore, by forming the retention groove 64 further toward the opposite direction side to the X-direction than the locking surface 61, the friction member 6 can be downsized in the circumferential direction, as compared to a case where the locking surface 61 is formed within the range in the circumferential direction of the retention groove 64.

In this embodiment, the locking surface 61 of the friction member 6 is inclined with respect to the radial direction so as to face the X-direction side as it goes toward the outside in the radial direction, and therefore, assembling of the friction member 6 is easy.

Subsequently, the auto-tensioner 1 of a second embodiment of the present invention will be described with reference to FIG. 6. The same constituent elements as those in the first embodiment are denoted by the same reference numerals and description thereof is omitted. In the first embodiment described above, the rotating member 3 and the shaft 8 are separate members and the shaft 8 is fixed to the rotating member 3.

However, in the second embodiment, a shaft 208 is integrated with a rotating member 203. A protrusion portion 231 is formed at a root portion of the shaft 208, and similar to the first embodiment described above, the locking surface 31*a* and the contact surface 31*b* are formed in the protrusion portion 231.

Subsequently, the auto-tensioner 1 of a third embodiment of the present invention will be described with reference to FIGS. 7 and 8. In the first embodiment described above, the friction member 6 is configured with a single part. However, in the third embodiment, a friction member 306 is configured with two parts.

In the third embodiment, the friction member 306 contains a first part 306*x* and a second part 306*y* having a higher surface hardness than the first part 306*x*. The first part 306*x* is a part obtained by injection-molding synthetic resin such as polyamide (nylon 6T), for example. The second part 306*y* is a metal produce such as an aluminum alloy casting (ADC 12), for example. The first part 306*x* configures the arcuate surface 60 and the front face (i.e., a surface continuing to the arcuate surface 60 and coming into contact with the rotating member 3 in the axial direction in the friction member 306). The second part 306*y* configures the locking surface (the first locking part) 61 and the retention groove (the second locking part) 64.

In this manner, the locking surface (the first locking part) 61 and the retention groove (the second locking part) 64 are configured in the second part 306*y* having a relatively high surface hardness, and therefore, even in a case where a force acting on the locking surface 61 and the retention groove 64 increases with an increase in belt tension, damage to (deformation or depression of) the locking surface 61 and the retention groove 64 can be prevented. Furthermore, since damage to the locking surface 61 and the retention groove 64 is prevented, an application on a high-load drive system in which large belt tension is required, or realization of downsizing or the like of the friction member 306 is also possible. The first part 306*x* configures the arcuate surface 60 and the front face, and is made such that falling-off in the axial direction is prevented.

In addition, in the third embodiment, the first part 306*x* and the second part 306*y* respectively have concavity and convexity in the surfaces facing each other and are configured so as to mesh with each other in the circumferential direction. In this way, the first part 306*x* and the second part 306*y* can be disposed so as to be immovable with respect to one another in the circumferential direction even without performing adhesion by an adhesive, fixing by a rivet or the like, and can be easily assembled.

With respect to the concavity and convexity formed in the first part 306*x* and the second part 306*y*, a size, shape, pitch, or the like can be arbitrarily changed, and it is possible to adopt a relatively small size, pointed shape, narrow pitch, or the like, as in a modification example illustrated in FIG. 9.

Subsequently, the auto-tensioner 1 of a fourth embodiment of the present invention will be described with reference to FIG. 10. In the first embodiment described above, the front end portion (one end) of the coil spring 5 is bent in the vicinity of the tip and the portion further on the tip side than the bent portion extends linearly. However, in the fourth embodiment, a front end portion (one end) of a coil spring 405 has an arc shape and the arc-shaped portion is retained in a retention groove (a second locking part) 464 of the friction member 6.

According to the fourth embodiment, since one end of the coil spring 405 does not have a linear portion, the length of the coil spring 405 can be shortened, and therefore, the size of the retention groove (the second locking part) 464 can be reduced, whereby the friction member 6 can be downsized in the circumferential direction (e.g., a portion S illustrated by hatching in FIG. 10 can be omitted). A further reduction in the weight of the auto-tensioner 1 can be realized by the shortening of the length of the coil spring 405 and the downsizing in the circumferential direction of the friction member 6. In addition, since working such as bending one end of the coil spring 405 is not required, simplification of a manufacturing process and a reduction in manufacturing cost can be realized.

Subsequently, the auto-tensioner 1 of a fifth embodiment of the present invention will be described with reference to FIG. 11. In the first embodiment described above, the front end portion (one end) of the coil spring 5 is bent in the vicinity of the tip and the portion further on the tip side than the bent portion extends linearly. However, in the fifth embodiment, a front end portion (one end) of a coil spring 505 contains an arc-shaped portion 505*a* and a linear portion 505*b*. Both the arc-shaped portion 505*a* and the linear portion 505*b* are retained in a retention groove (a second locking part) 564 of the friction member 6.

According to the fifth embodiment, the size of the retention groove (the second locking part) 564 becomes larger, as compared to a case where one end of the coil spring 505 contains only an arc-shaped portion or a case where it contains only a linear portion. Therefore, the friction member 6 becomes larger by a portion T illustrated by hatching in FIG. 11 than in the first embodiment, and for this reason, the large area of the arcuate surface 60 can be secured, and the wear of the arcuate surface 60 can be suppressed.

Subsequently, the auto-tensioner 1 of a sixth embodiment of the present invention will be described with reference to FIG. 12. In the first embodiment described above, the locking surface (the first locking part) 61 of the friction member 6 is inclined with respect to the radial direction so as to face the X-direction side as it goes toward the outside in the radial direction. However, in the sixth embodiment, a locking surface (a first locking part) 661 of a friction member 606 is inclined with respect to the radial direction so as to face the opposite direction side to the X-direction as it goes toward the outside in the radial direction. In response to the locking surface 661, a locking surface 631a in a protrusion portion 631 of the rotating member 3 is also inclined with respect to the radial direction so as to face the opposite direction side to the X-direction as it goes toward the outside in the radial direction.

According to the sixth embodiment, in a case where belt tension decreases, the friction member 606 can be more reliably prevented from coming out in the circumferential direction.

The preferred embodiments of the present invention have been described above. However, the present invention is not limited to the above-described embodiments and various changes can be made within a scope as stated in the claims.

In each embodiment described above, the shaft 8 is fixed to the rotating member 3 and rotatably mounted on the base 2. However, the shaft 8 may be fixed to the base 2 and rotatably mounted on the rotating member 3. However, in this case, for example, the protrusion portion 31 of the rotating member 3 is formed in a ring shape, thereby making the friction member 6, 306, or 606 not come into contact with the shaft 8.

The angles of inclination of the locking surfaces (the first locking parts) 61 and 661 of the friction members 6 and 606 with respect to the radial direction are not limited to those illustrated in FIGS. 4 and 12. For example, the locking surfaces (the first locking parts) 61 and 661 may be formed along the radial direction. Also in this modification example, similar to the sixth embodiment described above, in a case where belt tension decreases, the friction member 6 can be more reliably prevented from coming out in the circumferential direction.

The posture support part 25 may have a supporting surface which supports the coil spring 5 in the radial direction, similar to the posture support part 24.

In the first embodiment described above, the posture support part 24 and the posture support part 25 configure the posture supporting means in the present invention. However, the configuration of the posture supporting means in the present invention is not limited thereto. For example, the posture supporting means may be configured with only the posture support part 24 without providing the posture support part 25. Furthermore, the posture supporting means may be configured with three or more posture support parts formed in the same manner as the posture support part 24 or 25.

In the third embodiment described above, the first part 306x and the second part 306y are configured so as to mesh with each other in the circumferential direction and can be assembled without performing adhesion by an adhesive, fixing by a rivet, or the like. However, there is no limitation thereto. For example, the first part and the second part may be assembled by adhesion by an adhesive, fixing by a rivet, or the like. In addition, a configuration is also acceptable in which after the second part is disposed as an insert material in a mold, synthetic resin which becomes the first part is injection-molded, whereby the first part and the second part are integrated with each other.

The respective embodiments described above can be arbitrarily combined. For example, the friction member 306 of the third embodiment and the coil spring 405 of the fourth embodiment or the coil spring 505 of the fifth embodiment may be combined. Furthermore, for example, the friction member 606 of the sixth embodiment and the coil spring 405 of the fourth embodiment or the coil spring 505 of the fifth embodiment may be combined.

The present application is based on Japanese Patent Application No. 2014-028133 filed on Feb. 18, 2014, Japanese Patent Application No. 2014-262127 filed on Dec. 25, 2014 and Japanese Patent Application No. 2015-010210 filed on Jan. 22, 2015, the contents of which are incorporated herein by reference.

DESCRIPTION OF REFERENCE NUMERALS AND SIGNS

1: auto-tensioner
2: base
3, 203: rotating member
4: pulley
5, 405, 505: coil spring
6, 306, 606: friction member
306x: first part
306y: second part
20: pedestal part
21: outer cylindrical part (cylindrical part)
23: retention groove (end portion retaining means)
24, 25: posture support part (posture supporting means)
24a, 25a: axial direction supporting surface
24b: radial direction supporting surface
31, 231, 631: protrusion portion
31a, 631a: locking surface
31b: contact surface
60: arcuate surface
61, 661: locking surface (first locking part)
62, 63: side surface
64, 464, 564: retention groove (second locking part)
505a: arc-shaped portion
505b: linear portion

The invention claimed is:

1. An auto-tensioner comprising:
a base having a cylindrical part;
a rotating member supported so as to be rotatable with respect to the base;
a pulley rotatably provided at the rotating member;
a friction member sandwiched between an inner circumferential surface of the cylindrical part and the rotating member in a radial direction of the cylindrical part; and
a coil spring which has one end locked to the friction member and another end locked to the base and is disposed in a state of being compressed in an axial direction of the cylindrical part, thereby pressing the friction member against the rotating member in the axial direction and rotationally biasing the rotating member in one direction with respect to the base through the friction member,
wherein the friction member has:
an arcuate surface capable of sliding along the inner circumferential surface of the cylindrical part,
a first locking part located further toward the one direction side than the arcuate surface in a circumferential direction of the cylindrical part and locked to the rotating member, and a second locking part locked to the one end of the coil spring, and located further toward the outside in the radial direction than the first locking part, and wherein no portion of the friction member, including the second locking part, which directly contacts the coil spring is disposed more inside in the radial direction than the first locking part.

2. The auto-tensioner according to claim 1, wherein the second locking part of the friction member is located further toward the opposite direction side to the one direction in the circumferential direction than the first locking part.

3. The auto-tensioner according to claim 1, wherein the friction member comprises a first part and a second part having a higher surface hardness than the first part, the first part configures the arcuate surface and a surface that continues to the arcuate surface and comes into contact with the rotating member in the axial direction in the friction member, and the second part configures the first locking part and the second locking part.

4. The auto-tensioner according to claim 3, wherein the first part and the second part are configured so as to mesh with each other in the circumferential direction.

5. The auto-tensioner according to claim 1, wherein the one end of the coil spring has an arc shape.

6. The auto-tensioner according to claim 1, wherein the one end of the coil spring comprises an arc-shaped portion and a linear portion.

7. The auto-tensioner according to claim 1, wherein the base has a pedestal part provided inside of one end portion of the cylindrical part, and the pedestal part has:
- an end portion retaining means for retaining another end portion of the coil spring, and
- a posture supporting means for supporting a portion further on the one end side than a portion retained by the end portion retaining means in a first turn region on the other end portion side of the coil spring, in the axial direction and the radial direction.

8. The auto-tensioner according to claim 1, wherein the first locking part is inclined with respect to the radial direction so as to face the one direction side as it goes toward the outside in the radial direction.

9. The auto-tensioner according to claim 1, wherein the first locking part is inclined with respect to the radial direction so as to face the opposite direction side to the one direction as it goes toward the outside in the radial direction.

* * * * *